United States Patent [19]
Myers

[11] Patent Number: 5,632,685
[45] Date of Patent: May 27, 1997

[54] END FITTING FOR DRIVE SHAFT ASSEMBLY AND METHOD OF MANUFACTURING SAME

[75] Inventor: Gerald L. Myers, Maumee, Ohio

[73] Assignee: Dana Corporation, Toledo, Ohio

[21] Appl. No.: 567,122

[22] Filed: Dec. 4, 1995

[51] Int. Cl.$^6$ .................................................. F16C 3/02
[52] U.S. Cl. ........................... 464/183; 403/268; 464/179
[58] Field of Search ................................ 464/181, 182, 464/183, 179, 134, 157; 403/265, 268, 383

[56] References Cited

U.S. PATENT DOCUMENTS

| | | |
|---|---|---|
| 4,211,589 | 7/1980 | Fisher et al. . |
| 4,336,678 | 6/1982 | Peters . |
| 4,523,554 | 6/1985 | Ryu . |
| 4,583,755 | 4/1986 | Diekman et al. . |
| 4,932,924 | 6/1990 | Lobel ........................... 464/181 |
| 5,037,233 | 8/1991 | Nishihara et al. . |
| 5,087,147 | 2/1992 | Petrzelka et al. .............. 403/265 X |
| 5,118,214 | 6/1992 | Petrzelka et al. .............. 403/265 X |
| 5,309,620 | 5/1994 | Shinohara et al. ............. 464/181 X |
| 5,421,781 | 6/1995 | Mackellar ....................... 464/183 |

FOREIGN PATENT DOCUMENTS

| | | | |
|---|---|---|---|
| 564194 | 10/1993 | European Pat. Off. ......... | 464/181 |
| 40-1074315 | 3/1989 | Japan ............................ | 464/181 |

Primary Examiner—Daniel P. Stodola
Assistant Examiner—Eileen A. Dunn
Attorney, Agent, or Firm—MacMillan, Sobanski & Todd

[57] ABSTRACT

An end fitting for use in a vehicular drive shaft assembly includes a body having a cylindrical sleeve portion extending therefrom. The sleeve portion of the end fitting has a plurality of recessed areas formed therein which extend longitudinally from a first end of the sleeve portion to a second end thereof. The recessed areas may be defined by planar surfaces which intersect the sleeve portion of the end fitting at a slight angle relative to the axis of rotation thereof. Each of the recessed areas has a cross sectional shape defined by a radial depth and a chordal width. The cross sectional shapes of the recessed areas vary along the lengths thereof. Preferably, the radial depths and the chordal widths are at minimum values adjacent the first end of the sleeve portion of the end fitting and are at maximum values adjacent the second end of the sleeve portion. To assemble the drive shaft assembly, adhesive is applied either to the outer chordal surface of the sleeve or to the inner cylindrical surface of a drive shaft tube. Then, the sleeve portion of the end fitting is inserted within the drive shaft tube such that the outer surface of the sleeve portion engages the inner cylindrical surface of the drive shaft tube in a light press relationship. As the leading edge of the end fitting is inserted within the drive shaft tube, the adhesive is urged to flow into the recessed areas. The adhesive material is subsequently cured to form an adhesive bond between the end fitting and the inner cylindrical surface of the drive shaft tube.

19 Claims, 2 Drawing Sheets

END FITTING FOR DRIVE SHAFT ASSEMBLY AND METHOD OF MANUFACTURING SAME

BACKGROUND OF THE INVENTION

This invention relates in general to vehicle drive shaft assemblies which include a drive shaft tube formed from a composite material and an end fitting formed from a metallic material. In particular, this invention relates to an improved structure for such an end fitting and a method for manufacturing same.

In many different types of vehicles, a drive shaft assembly is utilized to transmit rotational power from a source, such as an engine, to a driven component, such as a pair of wheels. A typical vehicle drive shaft assembly includes a hollow cylindrical drive shaft tube having an end fitting secured to each end thereof. Usually, the end fittings are embodied as tube yokes which are adapted to cooperate with respective universal joints. For example, a drive shaft assembly of this general type is often used to provide a rotatable driving connection between the output shaft of a vehicle transmission and an input shaft of an axle assembly for rotatably driving the vehicle wheels.

In the past, both the cylindrical drive shaft tube and the two end fittings have been formed from a metallic material, such as steel. Steel end fittings are relatively easy to weld to a steel drive shaft tube, and the welded connection is effective for transmitting the torque loads normally encountered during vehicle use through the drive shaft assembly. However, such steel components are relatively heavy and, therefore, undesirably add weight to the vehicle. To address this, it is known to form the cylindrical drive shaft tube from a fiber reinforced composite material, such as carbon graphite or fiber glass reinforced synthetic resin. These composite materials are substantially lighter than steel, but still possess the strength and durability for transmitting the torque loads normally encountered during vehicle operation.

Unfortunately, because of the differences in the respective materials, it has been found to be somewhat difficult to provide a sufficiently strong connection between a drive shaft tube formed from a composite material and an end fitting formed from a metallic material. A number of structures and methods are known in the art for providing such a connection. For example, it is known to use an adhesive material to secure a cylindrical metallic end fitting to a cylindrical composite drive shaft tube. The use of adhesives alone with these structures, however, has not been found to be completely satisfactory. Alternatively, it is known to provide a tight friction engagement between the metallic end fitting and the composite drive shaft tube, and to reinforce this frictional engagement with a compression ring secured thereabout. While effective, this structure involves relatively tight tolerances and additional parts, increasing cost and complexity of the drive shaft assembly. Thus, it would be desirable to provide an improved structure for an end fitting and a method of manufacturing same which is strong and durable, which is relatively easy and inexpensive to construct, and which is readily securable to a composite drive shaft tube by an adhesive.

SUMMARY OF THE INVENTION

This invention relates to an improved structure for an end fitting for use in a vehicular drive shaft assembly and a method for making same. The drive shaft assembly includes a hollow drive shaft tube having an end fitting secured to one or both ends thereof. The end fitting includes a body having a cylindrical sleeve portion extending therefrom. The end fitting may include a connecting structure, such as a pair of yoke arms, to provide a rotational driving connection between the end fitting and another portion of the drive shaft assembly. The sleeve portion of the end fitting has a plurality of recessed areas formed therein which extend longitudinally from a first end of the sleeve portion to a second end thereof. The recessed areas may be defined by planar surfaces which intersect the sleeve portion of the end fitting at a slight angle relative to the axis of rotation thereof. Each of the recessed areas has a cross sectional shape defined by a radial depth and a chordal width. The cross sectional shapes of the recessed areas vary along the lengths thereof. Preferably, the radial depths and the chordal widths are at minimum values adjacent the first end of the sleeve portion of the end fitting and are at maximum values adjacent the second end of the sleeve portion. To assemble the drive shaft assembly, adhesive is applied either to the outer circumferential surface of the sleeve or to the inner cylindrical surface of the drive shaft tube. Then, the sleeve portion of the end fitting is inserted within the drive shaft tube such that the outer surface of the sleeve portion engages the inner cylindrical surface of the drive shaft tube in a light press relationship. As the leading edge of the end fitting is inserted within the drive shaft tube, the adhesive is urged to flow into the recessed areas. The adhesive material is subsequently cured to form an adhesive bond between the end fitting and the inner cylindrical surface of the drive shaft tube.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
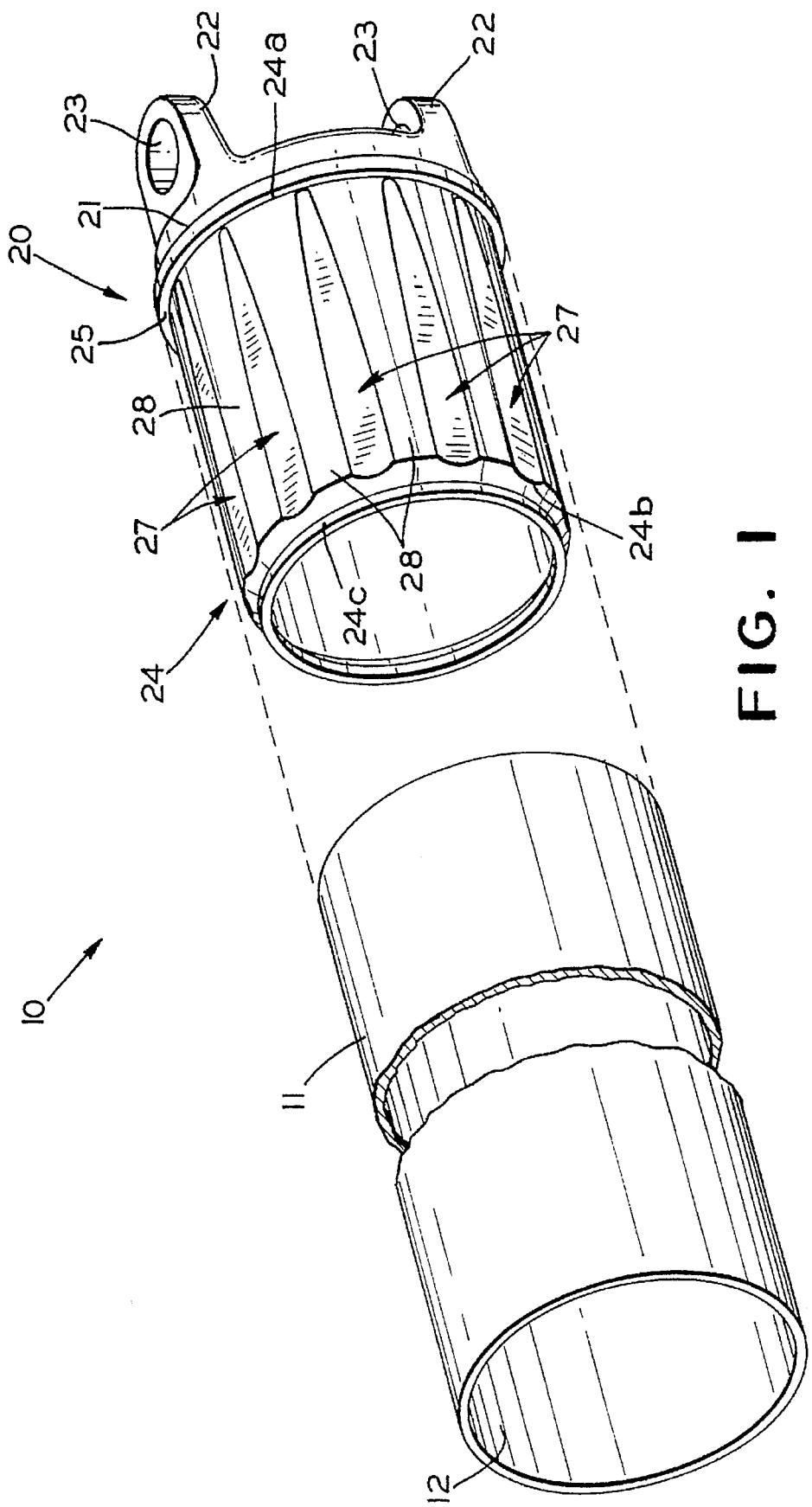
FIG. 1 is an exploded perspective view of a vehicular drive shaft assembly in accordance with this invention including a drive shaft tube formed from a composite material and an end fitting formed from a metallic material.
Figure 2:
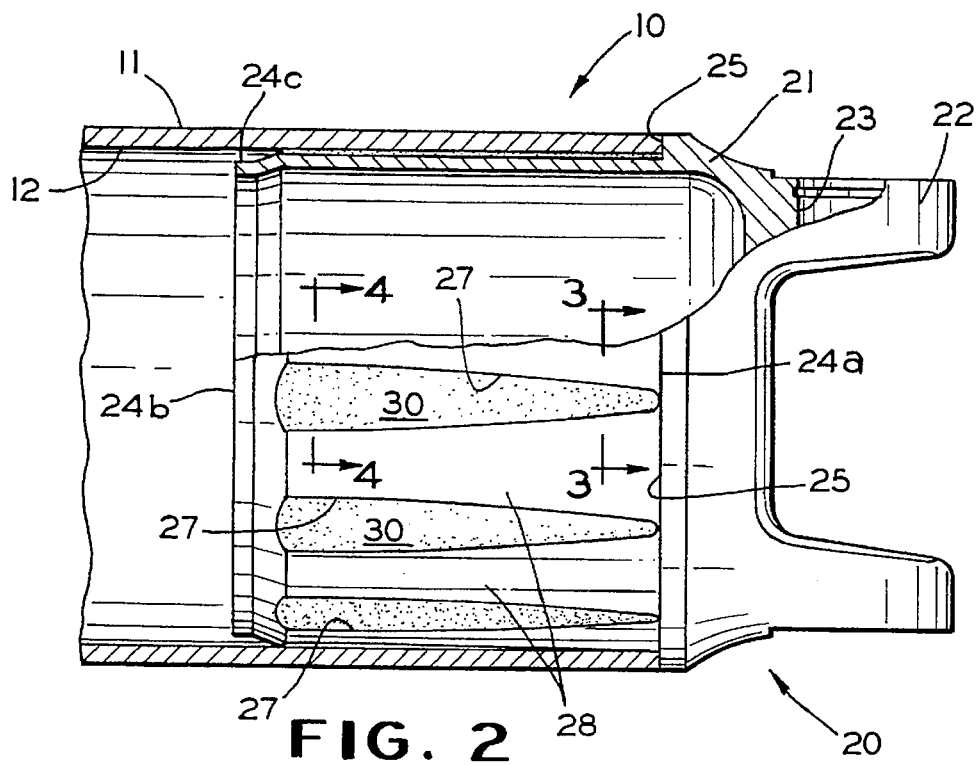
FIG. 2 is a sectional elevational view of the drive shaft assembly illustrated in FIG. 1 shown assembled.

Referring now to the drawings, there is illustrated in FIGS. 1 and 2 a vehicular drive shaft assembly, indicated generally at 10, in accordance with this invention. The drive shaft assembly 10 includes a hollow cylindrical drive shaft tube 11 having a pair of open ends and an inner cylindrical surface 12. The drive shaft tube 11 is conventional in the art and is preferably formed from a suitable composite material. For example, the drive shaft tube 11 may be formed from a resin, such as an epoxy or a phenolic resin, which is reinforced with a plurality of high strength and high modulus fibers, such as carbon graphite or fiber glass.

An end fitting, indicated generally at 20, is secured to one or both ends of the drive shaft tube 11. The end fitting 20 includes a body 21 having a connecting structure provided thereon. In the illustrated embodiment, the end fitting 20 is a tube yoke, and the connecting structure is a pair of opposed yoke arms 22 which extend longitudinally from the body 21. The yoke arms 22 have respective aligned bores 23 formed therethrough which are adapted to receive bearing cups (not shown) of a conventional universal joint cross assembly, as is well known in the art. However, the end fitting 20 may be formed having any other conventional connecting structure which is adapted to provide a rotational driving connection between the end fitting 20 and another portion (not shown) of the vehicular drive shaft assembly 10. For example, the end fitting 20 may be embodied as a tube shaft, a splined sleeve, or other known torque transmitting device. The end fitting 20 is preferably formed from a suitable metallic material, such as steel or aluminum.

The end fitting 20 further includes a hollow cylindrical sleeve portion, indicated generally at 24, which extends longitudinally from the body 21 to an open end relative to a central axis of rotation. Thus, as shown in the drawings, the sleeve portion 24 extends from a first end 24a located adjacent to the yoke arms 22 to a second end 24b located adjacent the open end. If desired, the open end of the sleeve portion 24 may be formed having a reduced diameter, as best shown at 24c in FIG. 2. The outer diameter of the sleeve portion 24 may be formed somewhat smaller than the outer diameter of the body 21. Thus, an external annular shoulder 25 may be defined between the body 21 of the end fitting 20 and the sleeve portion 24.

The outer circumferential surface of the sleeve portion 24 has at least one recessed area, indicated generally at 27, formed therein. Preferably, a plurality of such recessed areas 27 are formed in the outer circumferential surface of the sleeve portion 24 of the end fitting 20. In the illustrated embodiment, eighteen recessed areas 27 are formed in the outer circumferential surface of the sleeve portion 24, although a greater or lesser number may be provided as desired. Each recessed area 27 extends generally longitudinally from the first end 24a of the sleeve portion 24 toward the second end 24b of the sleeve portion 24. A plurality of longitudinally extending lands 28 are defined on the outer surface of the sleeve portion 24 in the circumferential spaces between adjacent pairs of the recessed areas 27.

Each of the recessed areas 27 may be defined by a planar surface which intersects the sleeve portion 24 of the end fitting 20 at a slight angle relative to the central axis of rotation thereof. When formed in this manner, each of the recessed areas 27 has a somewhat tapered or semi-elliptical shape, as best shown in FIGS. 1 and 2. Thus, the cross sectional shapes of the recessed areas 27 vary along the lengths thereof. The cross sectional shape of a given recessed area 27 at any point along the longitudinal length thereof can be defined by a radial depth and a chordal width. In the illustrated embodiment, the radial depth is equal to a first radius extending from the central axis of rotation of the end fitting 20 to the outer curved surface of one of the lands 28 adjacent to a recessed area 27 less a second radius extending from the same axis of rotation to the outer chordal surface of that recessed area 27. Thus, the radial depth is designated as D1 in FIG. 3 and D2 in FIG. 4. In the illustrated embodiment, the chordal width is equal to the width of a recessed area 27 measured along a chord line extending from one longitudinally extending edge of the recessed area 27 to the opposite longitudinally extending edge thereof. Thus, the chordal width is designated as W1 in FIG. 3 and W2 in FIG. 4.

Figure 3:
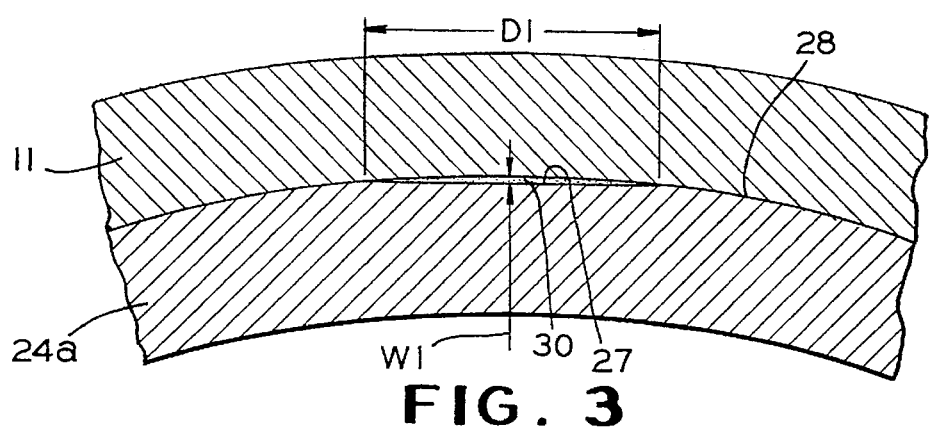
FIG. 3 is an enlarged end view of a portion of the metallic end fitting taken along line 3—3 of FIG. 2.
Figure 4:
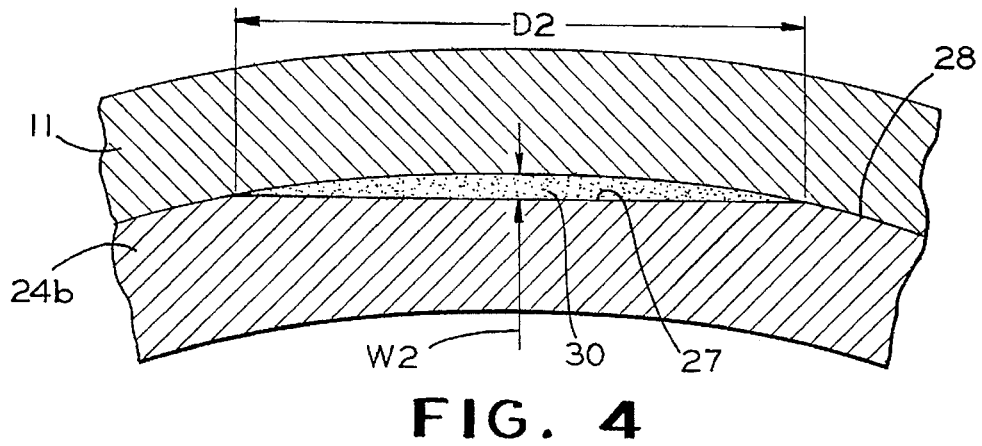
FIG. 4 is an enlarged end view of a portion of the metallic end fitting taken along line 4—4 of FIG. 2.

The cross sectional shape of each of the illustrated recessed areas 27 varies in both radial depth and chordal width from the first end 24a of the sleeve portion 24 to the second end 24b thereof. More specifically, as shown in FIG. 3, the radial depth D1 and the chordal width W1 are both at minimum values adjacent the first end 24a of the sleeve portion 24. The cross sectional shapes of the recessed areas 27 increase in size from the first end 24a of the sleeve 24 to the second end 24b thereof. Thus, as shown in FIG. 4, the radial depth D2 and the chordal width W2 are both at maximum values adjacent the second end 24b of the sleeve portion 24. Thus, in the illustrated embodiment, the radial depths D1 and the chordal widths W1 of the recessed areas 27 are at their minimum values adjacent to the shoulder 25, while the radial depths D2 and the chordal widths W2 of the recessed areas 27 are at their maximum values adjacent to the open end of the end fitting 20.

In the illustrated embodiment, the recessed areas 27 are of uniform size and shape, and further are equidistantly spaced apart from one another about the circumference of the sleeve portion 24. However, the recessed areas 27 need not be formed having such uniform size and shape or be equidistantly spaced. The specific values of the radial depth and chordal width of the recessed areas 27 may vary depending upon (among other things) the overall size of the end fitting 20, the specific application for the drive shaft assembly 10, and the specific materials used to form the drive shaft tube 11 and the end fitting 20. For example, the drive shaft tube 11 may be formed from a composite material and have an inner diameter of about 3.84 inches. The sleeve portion 24 of the end fitting 20 may be formed from 6061-T6 aluminum alloy, have an outer diameter of about 3.85 inches, and a longitudinal length of about 3.87 inches (including the reduced diameter open end 24c). In this instance, it has been found acceptable to form the recessed areas 27 having a maximum radial depth of about 0.025 inch and a maximum chordal width of about 0.635 inch.

The longitudinal length of each of the recessed areas 27 is relatively large in comparison to the radial depth and the chordal width thereof. Preferably, the recessed areas 27 extend about substantially the entire circumference of the second end 24b of the sleeve portion 24 of the end fitting 20. Also, it is preferably that the recessed areas 27 along substantially the entire length of the sleeve portion 24 of the end fitting 20. However, some or all of the recessed areas 27 may extend only partially along substantially the entire length of the sleeve portion 24 of the end fitting 20. Furthermore, it will be appreciated that the some or all of the recessed areas 27 may be spaced apart somewhat from either or both of the first and second ends 24a and 24b, respectively, of the sleeve portion 24. The recessed areas 27 may be formed in the sleeve portion 24 of the end fitting 20 by any conventional means. For example, the recessed areas 27 may be formed by removing material using a metal cutting or machining tool. As mentioned above, the tapered or semi-elliptical shape of the recessed areas 27 can be made using a single pass of a cutting tool or multiple passes straddle milling tool to form a planar surface. The cut can be made at an angle to the axis of rotation of the end fitting 20, thus causing the radial depth of the recessed areas 27 to vary from a maximum depth to a minimum depth as described above. Alternatively, the recessed areas 27 may be formed directly in the sleeve portion 24, such as by net forming. Although the illustrated recessed areas 27 are defined by chordal planar surfaces, it will be appreciated that the recessed areas 27 can be formed having other configurations. For example, the recessed areas 27 may be formed by cutting grooves having longitudinal extending side walls into the outer surface of the sleeve portion 24. Alternatively, the recessed areas 27 may be non-planar.

The end fitting 20 is secured to the drive shaft tube 11 to form the drive shaft assembly 10. To accomplish this, a quantity of an adhesive 30 is initially applied to either the outer circumferential surface of the sleeve portion 24 of the end fitting 20 or to the inner cylindrical surface 12 of the drive shaft tube 11. Preferably, a bead of the adhesive 30 is applied to the inner circumferential surface 12 of the drive shaft tube 11. A number of adhesive materials are known in the art for effectively bonding the metallic end fitting 20 to the composite drive shaft tube 11. A thixotropic paste, such as is commercially available from Magnolia Plastics of Chamblee, Ga. is preferred. However, a two-part epoxy resin adhesive, such as Magnobond 6398 which is also commercially available from Magnolia Plastics, may be used.

After the adhesive 30 has been applied, the sleeve portion 24 of the end fitting 20 is inserted longitudinally within the open end of the drive shaft tube 11. The outer diameter of the sleeve portion 24 of the end fitting 20, defined by the lands 28, is slightly larger than the inner diameter of the drive shaft tube 11 defined by the inner cylindrical surface 12. Thus, when the end fitting 20 is inserted longitudinally within the open end of the drive shaft tube 11, the lands 28 engage the inner cylindrical surface 12 of the drive shaft tube 11 in a light press fit relationship. This light press fit engagement facilitates the longitudinal alignment and concentricity of the sleeve portion 24 of the end fitting 20 with the drive shaft tube 11. During such insertion, the leading edge of the sleeve portion 24 of the end fitting 20 engages the adhesive 30.

The reduced diameter open end 24c of the sleeve portion 24 captures the adhesive 30 within pockets defined between the outer surfaces of the recessed areas 27 and the inner circumferential surface 12 of the drive shaft tube 11. As a result, insertion of the end fitting 20 within the drive shaft tube 11 causes the adhesive 30 to flow longitudinally into the recessed areas 27. The insertion of the sleeve portion 24 of the end fitting 20 continues until the leading edge to thereof abuts the annular shoulder 25 provided on the end fitting 20. Then, the adhesive 30 is allowed to set or cure to form a plurality of adhesive bonds between the outer circumferential surface of the sleeve portion 24 and the inner cylindrical surface 12 of the composite drive shaft tube 11. Alternative energy curing processes, such as thermal, microwave, magneto-thermal, and the like may be used to accelerate the curing process.

As mentioned above, the insertion of the leading edge of the sleeve portion 24 of the end fitting 20 within the open end of the drive shaft tube 11 causes the adhesive 30 to flow into the recessed areas 27. Because of the decreasing cross sectional shape of the recessed areas 27, the adhesive 30 is compacted to flow longitudinally throughout the entire lengths of the recessed areas 27 so as to substantially fill the entire volume thereof. This occurs because the tapered or semi-elliptical shape of the recessed areas 27 captures the adhesive 30 in the radially deepest and circumferentially widest portions of the recessed areas 27 and will tend to urge the adhesive 30 to flow throughout the radially shallower and circumferentially narrower portions thereof. The narrowest portions of the recessed areas are the last to be sealed off by the drive shaft tube 11 and, therefore, vent any entrapped air therefrom. As a result, voids in the adhesive 30 are reduced, and the density of the adhesive 30 is relatively constant throughout each of the recessed areas 27. The application of the adhesive 30 as described above also reduces the possibility of potential stress risers in either the end fitting 20 or the drive shaft tube 11. Finally, the changing cross sectional shapes of the recessed areas 27 can provide a changing spring rate along the length of the drive shaft assembly 10 to enhance the distribution of stresses at the connection between the drive shaft tube 11 and the end fitting 20. The bonds formed by the adhesive material 30 provide for the transmission of torque between the end fitting 20 and the drive shaft tube 11.

Although this invention has been described and illustrated in the context of a metallic end fitting 20 connected to a composite drive shaft tube 11, it will be appreciated that the structure and method of this invention can applied when the end fitting 20 and drive shaft tube 11 are formed from materials other than discussed above. Furthermore, the drive shaft tube 11 and the end fitting 20 may be formed from the same material if desired.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A drive shaft assembly comprising:
   a hollow drive shaft tube having an open end and an inner surface defining an inner dimension;
   an end fitting including a body and a sleeve portion extending from said body to an end, said sleeve portion having an outer surface defining an outer dimension which is slightly larger than said inner dimension, said outer surface having a recessed area formed therein which extends from a first end located adjacent to said body to a second end located adjacent to said end, said recessed area having a cross sectional shape which varies between said first end and said second end, said sleeve portion being disposed within said drive shaft tube such that regions of said outer surface of said sleeve portion circumferentially adjacent to said recess frictionally engage said inner surface of said drive shaft tube; and
   an adhesive material provided in said recessed area to form a permanent adhesive bond between said sleeve portion and said inner surface of said drive shaft tube.

2. The drive shaft assembly defined in claim 1 wherein said cross sectional shape of said recessed area varies in one of depth and width.

3. The drive shaft assembly defined in claim 2 wherein said cross sectional shape of said recessed area varies in depth from a minimum value adjacent to said first end to a maximum value adjacent to said second end.

4. The drive shaft assembly defined in claim 2 wherein said cross sectional shape of said recessed area,. varies in width from a minimum value adjacent to said first end to a maximum value adjacent to said second end.

5. The drive shaft assembly defined in claim 1 wherein said cross sectional shape of said recessed area varies in both depth and width.

6. The drive shaft assembly defined in claim 5 wherein said cross sectional shape of said recessed area varies in depth from a minimum value adjacent to said first end to a maximum value adjacent to said second end, and wherein said cross sectional shape of said recessed area varies in width from a minimum value adjacent to said first end to a maximum value adjacent to said second end.

7. The drive shaft assembly defined in claim 1 wherein said recessed area is defined by a planar surface which intersects said sleeve portion.

8. The drive shaft assembly defined in claim 7 wherein said sleeve portion of said end fitting defines an axis of rotation, and wherein said planar surface intersects said sleeve portion at an angle relative to said axis of rotation.

9. The drive shaft assembly defined in claim 1 wherein said outer surface of said sleeve has a plurality of recessed areas formed therein.

10. The drive shaft assembly defined in claim 9 wherein said cross sectional shapes of said recessed areas vary uniformly.

11. The drive shaft assembly defined in claim 9 wherein said recessed areas are equidistantly spaced apart from one another about said sleeve portion.

12. The drive shaft assembly defined in claim 9 wherein said cross sectional shapes of said recessed areas vary in one of depth and width.

13. The drive shaft assembly defined in claim 12 wherein said cross sectional shapes of said recessed areas vary in depth from a minimum value adjacent to said first end to a maximum value adjacent to said second end.

14. The drive shaft assembly defined in claim 12 wherein said cross sectional shapes of said recessed areas vary in width from a minimum value adjacent to said first end to a maximum value adjacent to said second end.

15. The drive shaft assembly defined in claim 9 herein said cross sectional shapes of said recessed areas vary in both depth and width.

16. The drive shaft assembly defined in claim 1 wherein said outer surface of said sleeve portion of said end fitting engages said inner surface of said drive shaft tube in a light press fit relationship.

17. A method for making an end fitting for use in a drive shaft assembly comprising the steps of:

(a) providing a hollow drive shaft tube having an open end and an inner surface defining an inner dimension;

(b) providing an end fitting including a body and a sleeve portion extending from said body to an end, said sleeve portion having an outer surface defining an outer dimension which is slightly larger than said inner dimension, said outer surface having a recessed area formed therein which extends from a first end located adjacent to said body to a second end located adjacent to said end, said recessed area having a cross sectional shape which varies between said first end and said second end;

(c) providing an adhesive material in said recessed area; and (d) disposing said sleeve portion within said drive shaft tube such that said regions of outer surface of said sleeve portion circumferentially adjacent to said recess frictionally engage said inner surface of said drive shaft tube and said adhesive forms a permanent adhesive bond between said sleeve portion and said inner surface of said drive shaft tube.

18. The method defined in claim 17 wherein said cross sectional shape of said recessed area varies in one of depth and width.

19. The method defined in claim 17 wherein said cross sectional shape of said recessed area varies in both depth and width.

* * * * *